June 14, 1960 W. V. TYRLICK 2,941,191
CHARACTER SEQUENCE DETECTOR
Filed April 16, 1958
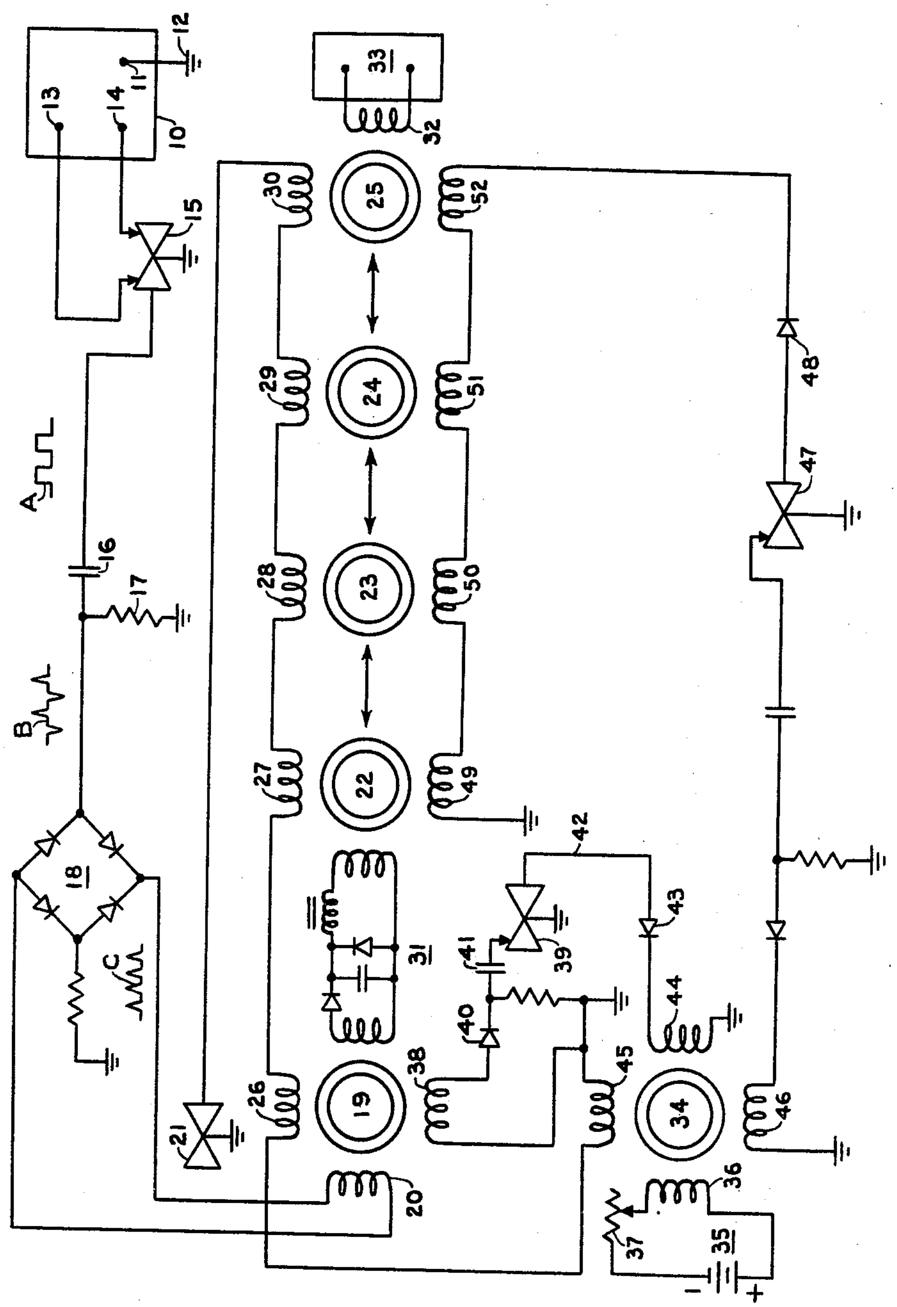
INVENTOR.
WILLIAM V. TYRLICK
BY
Richard G. Stahr
ATTORNEY.

United States Patent Office 2,941,191

Patented June 14, 1960

2,941,191

CHARACTER SEQUENCE DETECTOR

William V. Tyrlick, Rochester, N.Y., assignor to General Dynamics Corporation, Rochester, N.Y., a corporation of Delaware Filed Apr. 16, 1958, Ser. No. 728,818

10 Claims. (Cl. 340—174)

The present invention relates to character sequence detectors and, more specifically, to a character sequence detector employing only solid state components.

There are numerous applications, particularly with the use of information which is expressed in binary form, in which certain specific functions are preceded or succeeded by a signal which is generally in the form of a preselected sequence of two or more characters. Therefore, in these applications it is important that a device be employed which is responsive to this preselected sequence of characters and no other and also be sensitive to any deviations in this preselected sequence.

It is, accordingly, an object of this invention to provide an improved character sequence detector.

It is another object of this invention to provide a character sequence detector employing only solid state components.

In accordance with this invention, a signal pulse, which is produced as each character of a preselected sequence is detected, is transformed into a shift energizing current pulse for each character. The energizing current pulses are applied to the initial magnetic member of a magnetic shift register circuit having a plurality of magnetic members in a polarity sense which will produce in the initial member the stable condition of remanence which has been selected to correspond to the presence of a character, the other condition of remanence, then, corresponding to the absence of a character. The condition of remanence of each magnetic member of the shift register is successively transferred from each preceding member to the next succeeding member of the shift register circuit by a shift energizing current pulse which is simultaneously applied to all members of the shift register in timed relationship with the signal energizing current pulses. The presence of a pulse in the output circuit of the final member of the shift register circuit, therefore, indicates that all characters have been received in their proper sequence.

A reset circuit is provided for the purpose of supplying a reset energizing current pulse in response to a shift energizing current pulse only when the initial member of the shift register circuit is in the condition of remanence corresponding to the absence of a character. This reset energizing current pulse, when produced, is simultaneously applied to all of the members of the shift register circuit except the initial member. In this manner, then, the shift register is cleared at the end of each sequence or during the sequence in the event one or more of the characters should not be present.

For a better understanding of the present invention, together with further objects, advantages and features thereof, reference is made to the following description and accompanying drawing, in which the single figure illustrates the preferred embodiment of the present invention.

To facilitate the description, and in no way intending or inferring that this invention be limited thereto, a specific example of an application of this invention is in the teletypewriter switching art. In this instance, a "start of message character sequence" is generally represented by ZCZC. Therefore, the operation of the device of this invention will be on the basis of detecting a ZCZC character sequence.

In the teletypewriter switching art, a decoder is employed which is sensitive to each character received and produces an output pulse therefor. This device, the details of which form no part of this invention and are well known in the art, is indicated in block form at 10. One terminal 11 of this device is connected to point-of-reference potential 12, while terminals 13 and 14, respectively, are connected to opposite sides of a bistable multivibrator 15. Upon the receipt of either a Z or a C, this device will produce a signal pulse at terminals 13 and 14, respectively.

Multivibrator 15 is alternately switched from one condition of conduction to the other as the signal pulses produced by device 10 are alternately applied thereto from terminals 13 and 14 of decoder device 10, thereby producing a substantially square wave output, as indicated at A. Each opposite polarity excursion of this square wave, in this instance four, represents one of the characters of the ZCZC sequence. To produce a signal energizing current pulse, this square wave is differentiated in a circuit comprised of capacitor 16 and resistor 17, the waveform output of which is indicated at B. So that the signal energizing current pulses are all of the same polarity, a full-wave rectifier 18 is employed, the output waveform of which is indicated at C. In this manner, a signal energizing current pulse of the same polarity is produced for each character of the sequence.

These signal energizing current pulses are applied to the initial member 19 of a magnetic core shift register circuit through coupling winding 20 in a polarity sense to produce in member 19 the condition of remanence which has been selected to correspond to the presence of an energizing signal pulse or the character which it represents. This shift register comprises five magnetic core members, each being toroidal in shape, indicated by reference numerals 19, 22, 23, 24 and 25 and are composed of a magnetic material having substantially square hysteresis loop characteristics. Each member of this shift register is capable of being magnetically saturated to either a first or a second condition of magnetic remanence.

At this time, a shift current pulse which is produced by a free-running multivibrator is applied in a timed relationship with the signal energizing current pulses to all members of the shift register circuit 19, 22, 23, 24 and 25 through respective coupling windings 26, 27, 28, 29 and 30 in a polarity sense opposite that of the signal energizing current pulse. In this manner, then, the condition of remanence of any preceding member, in this instance 19, is transferred to the next succeeding member, in this instance 22, through a unidirectional transfer circuit intercoupling the respective members. This circuit is detailed at 31 and, since it is identical between each of the next succeeding members, is thereafter indicated only by arrows.

So that the signal energizing current pulses may be successively transferred from member to member of the shift register, a shift energizing current pulse source is provided. In the illustrated embodiment, this shift energizing current pulse source comprises a multivibrator 21 of a conventional type and, hence, is shown diagrammatically and connected, as indicated, to the respective members of the shift register through respective coupling windings 26, 27, 28, 29 and 30 and to member 34 through coupling winding 45. The signal energizing current pulses, in this instance four, are impressed upon initial member 19 and are successively stepped to the next succeeding member of the shift register circuit by the shift current pulses produced by multivibrator 21. After the last signal energizing current pulse has been received and transferred to the next succeeding member of the shift register circuit, members 22–25, inclusive, are then all in the stable condition of remanence selected to correspond to the presence of a character. With the occurrence of the next shift energizing current pulse, an output is produced in coil 32 which is impressed upon a utilization circuit 33, the details of which form no part of this invention and is, therefore, represented in block form. The presence of an output pulse at this time in coil 32 of member 25, therefore, is an indication that all the characters have been received in their proper sequence.

To provide a reset circuit, another magnetic member 34 is provided. A constant direct current bias from source 35 is maintained on member 34 through coupling winding 36 in a polarity sense opposite that of the shift current pulses. The magnitude of this bias may be adjusted by potentiometer 37. As the shift current pulses transfer the stable condition of remanence from member 19 to the next succeeding member in a manner as previously described, an output pulse also appears in coupling winding 38 which is impressed upon a monostable multivibrator 39 through diode 40 and coupling capacitor 41. As multivibrator 39 is triggered, an output pulse appears in lead 42 and is applied to member 34 through diode 43 and coupling winding 44 in a polarity sense opposite that of the shift energizing current pulse. The shift energizing current pulses which are applied to member 34 through coupling winding 45, therefore, are ineffective to reverse the condition of remanence of member 34 in the presence of the direct current bias and the pulse applied through coupling winding 44.

After the receipt of the fourth signal energizing current pulse and its transfer from member 19 to the next succeeding member 22 by a shift energizing current pulse, member 19 is now in the condition of magnetic remanence corresponding to the absence of a signal. The condition of remanence of member 19 is not changed by the next shift energizing current pulse in that it is already in the condition of remanence produced by the shift energizing current pulse which results in the absence of an output pulse in coupling winding 38. As no output pulse is present to trigger multivibrator 39 at this time, there is no pulse present in coupling winding 44 of member 34. In the absence of this pulse, the shift energizing current pulse applied through coupling winding 45 of member 34 is effective to reverse its condition of remanence thereby producing a shift energizing current pulse in coupling winding 46. This shift energizing current pulse is strengthened and lengthened by bistable multivibrator 47.

Means is provided for simultaneously applying the reset energizing current pulses, i.e., the output of multivibrator 47, through diode 48 to members 22–25, inclusive, i.e., all of the members of the shift register circuit except the first, through respective coupling windings 49, 50, 51 and 52 in a polarity sense opposite that of the signal energizing current pulses. This reset energizing current pulse, therefore, returns magnetic remanence 22–25 to their initial state of magnetic remanence selected to correspond to the absence of a signal energizing current pulse or character and conditions them for the receipt of another sequence of characters from member 19.

Through the operation of the reset energizing current pulses in response to the shift energizing current pulses, only when member 19 of the shift register circuit is in the condition of remanence corresponding to the absence of a character, it is apparent that should one or more characters of the sequence be missing or be incorrect, the entire shift register circuit would be reset, thereby producing no output pulse in coupling winding 32 of member 25. The receipt of random Z characters and C characters in the text of the message are also removed from the shift register by the reset energizing pulses.

While I have shown and described the details of this invention on the basis of one specific sequence of two characters which occur alternately, it is obvious to those skilled in the art that various modifications and substitutions may be made without departing from the spirit of this invention which is to be limited only within the scope of the appended claims.

What is claimed is:

1. A solid state character sequence detector comprising in combination with a device which produces a signal pulse with each character of a predetermined sequence of characters; means for producing a signal energizing current pulse for each character; a magnetic shift register having a plurality of magnetic members each capable of being magnetically saturated to either a first or a second condition of magnetic remanence; first coupling circuit means for applying said signal energizing current pulses to the first magnetic member of said shift register in a polarity sense for producing in said first magnetic member either one of said first or second conditions of magnetic remanence selected to correspond to the presence of a character, the other condition of remanence corresponding to the absence of a character; a shift pulse source for producing shift energizing current pulses in timed relationship with said signal energizing current pulses; second coupling circuit means for applying said shift energizing current pulses simultaneously to all of said magnetic members in a polarity sense opposite that of said signal energizing current pulses; means responsive to said shift energizing current pulses for producing a reset energizing current pulse only when said first member of said shift register is in the condition of remanence corresponding to the absence of a character at the occurrence of any of said shift energizing current pulses; third coupling circuit means for simultaneously applying said reset energizing current pulse to all of the members of said shift register except the said first member thereof in a polarity sense opposite that of said signal energizing current pulse and output circuit means coupled to the final magnetic member of said magnetic shift register in which an output pulse appears when all of the characters are received in their predetermined sequence.

2. A character sequence detector of the type described in claim 1 in which said means for producing a signal energizing current pulse comprises at least a monostable multivibrator.

3. A character sequence detector of the type described in claim 1 in which said means, responsive to said shift energizing current pulses for producing a reset energizing current pulse is a separate magnetic member capable of being magnetically saturated to either a first or a second condition of remanence.

4. A character sequence detector of the type described in claim 1 in which said means responsive to said shift energizing current pulses for producing a reset energizing current pulse comprises a separate magnetic member capable of being magnetically saturated to either a first or second condition of remanence and a monostable multivibrator.

5. A solid state character sequence detector comprising in combination with a device which produces an opposite polarity signal pulse with each character of a predetermined sequence of two different alternately occurring characters; means for producing a signal energizing current pulse of the same polarity for each character; a magnetic shift register having a plurality of magnetic members each capable of being magnetically saturated to either a first or a second condition of magnetic remanence; first coupling circuit means for applying said signal energizing current pulses to the first magnetic member of said shift register in a polarity sense for producing in said first magnetic member either one of said first or second condition of magnetic remanence selected to correspond to the presence of a character, the other condition of remanence corresponding to the absence of a character; a shift pulse source for producing shift energizing current pulses in timed relationship with said signal energizing current pulses; second coupling circuit means for applying said shift energizing current pulses simultaneously to all of said magnetic members in a polarity sense opposite that of said signal energizing current pulses; means responsive to said shift energizing current pulses for producing a reset energizing current pulse only when said first member of said shift register is in the condition of remanence corresponding to the absence of a character at the occurrence of any of said shift energizing current pulses; third coupling circuit means for simultaneously applying said reset energizing current pulse to all of the members of said shift register except the said first member thereof in a polarity sense opposite that of said signal energizing current pulse and output circuit means coupled to the final magnetic member of said magnetic shift register in which an output pulse appears when all of the characters are received in their predetermined sequence.

6. A character sequence detector of the type described in claim 5 in which said means for producing a signal energizing current pulse of the same polarity for each character comprises a bistable multivibrator, a differentiating circuit and a full-wave rectifier circuit.

7. A character sequence detector of the type described in claim 5 in which said means responsive to said shift energizing current pulses for producing a reset energizing current pulse is a separate magnetic member capable of being magnetically saturated to either a first or a second condition of remanence.

8. A character sequence detector of the type described in claim 5 in which said means responsive to said shift energizing current pulses for producing a reset energizing current pulse comprises a separate magnetic member capable of being magnetically saturated to either a first or a second condition of remanence and a monostable multivibrator.

9. A solid state character sequence detector comprising in combination with a device which produces a signal pulse with each character of a predetermined sequence of characters; a monostable multivibrator means for producing a signal energizing current pulse for each character; a magnetic shift register having a plurality of magnetic members each capable of being magnetically saturated to either a first or a second condition of magnetic remanence; first coupling circuit means for applying said signal energizing current pulses to the first magnetic member of said shift register in a polarity sense for producing in said first magnetic member either one of said first or second condition of magnetic remanence selected to correspond to the presence of a character, the other condition of remanence corresponding to the absence of a character; a shift pulse source for producing shift energizing current pulses in timed relationship with said signal energizing current pulses; second coupling circuit means for applying said shift energizing current pulses simultaneously to all of said magnetic members in a polarity sense opposite that of said signal energizing current pulses; a separate magnetic member capable of being magnetically saturated to either a first or a second condition of remanence responsive to said shift energizing current pulses and a monostable multivibrator for producing a reset energizing current pulse only when said first member of said shift register is in the condition of remanence corresponding to the absence of a character at the occurrence of any of said shift energizing current pulses; third coupling circuit means for simultaneously applying said reset energizing current pulse to all of the members of said shift register except the said first member thereof in a polarity sense opposite that of said signal energizing current pulse and output circuit means coupled to the final magnetic member of said magnetic shift register in which an output pulse appears when all of the characters are received in their predetermined sequence.

10. A solid state character sequence detector comprising a combination with a device which produces an opposite polarity signal pulse with each character of a predetermined sequence of two different alternately occurring characters; means for producing a signal energizing current pulse of the same polarity for each character comprising a bistable multivibrator, a differentiating circuit and a full-wave rectifier; a magnetic shift register having a plurality of magnetic members each capable of being magnetically saturated to either a first or a second condition of magnetic remanence; first coupling circuit means for applying said signal energizing current pulses to the first magnetic member of said shift register in a polarity sense for producing in said first magnetic member either one of said first or second condition of magnetic remanence selected to correspond to the presence of a character, the other condtion of remanence corresponding to the absence of a character; a shift pulse source for producing shift energizing current pulses in timed relationship with said signal energizing current pulses; second coupling circuit means for applying said shift energizing current pulses simultaneously to all of said magnetic members in a polarity sense opposite that of said signal energizing current pulses; a separate magnetic member capable of being magnetically saturated to either a first or a second condition of remanence responsive to said shift energizing current pulses and a monostable multivibrator for producing a reset energizing current pulse only when said first member of said shift register is in the condition of remanence corresponding to the absence of a character at the occurrence of any of said shift energizing current pulses; third coupling circuit means for simultaneously applying said reset energizing current pulse to all of the members of said shift register except the said first member thereof in a polarity sense opposite that of said signal energizing current pulse and output circuit means coupled to the final magnetic member of said magnetic shift register in which an output pulse appears when all of the characters are received in their predetermined sequence.

References Cited in the file of this patent

UNITED STATES PATENTS

| | | |
|---|---|---|
| 2,794,970 | Yostpille | June 4, 1957 |
| 2,835,741 | Vaughan | May 20, 1958 |
| 2,846,669 | McMillan et al. | Aug. 5, 1958 |
| 2,849,539 | Abbott | Aug. 26, 1958 |